Patented Dec. 10, 1935

2,023,979

UNITED STATES PATENT OFFICE 2,023,979

PROCESS FOR BREAKING PETROLEUM EMULSIONS

Charles N. Stehr, Alhambra, Calif., assignor to Tretolite Company, Webster Groves, Mo., a corporation of Missouri No Drawing. Application November 12, 1934, Serial No. 752,714

5 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment, or is subjected to an equivalent separatory procedure.

The treating agent or demulsifying agent that I contemplate using in my process is a super-oxidized, semi-livery blown oil, as distinguished from blown oils of the kind which have heretofore been used in the arts and incidentally employed in the breaking of oil field emulsions. It is well known that at least some of the blown oils derived from reactive fatty bodies, particularly castor oil, and of the kind commercially available, may be employed to break petroleum emulsions. Certain ones may be used in specific combinations, such as that described in U. S. Patent No. 1,929,399, to Fuchs, dated October 3, 1933. Similarly, certain oxidized castor oils may be employed in combination with petroleum sulfonates to form demulsifying agents, as described in co-pending application for patent of DeGroote and Wirtel, Serial No. 715,773, filed March 15, 1934. Blown oils of the kind commercially available may also be employed in special mixtures of the kind described in my co-pending application for patent Serial No. 752,713, filed November 12, 1934.

It is to be noted that blown oils have been used in various arts prior to their use as demulsifying agents in the breaking of crude oil emulsions. Generally, the blown oils heretofore employed in the demulsification of crude oil, have consisted of conventionally available blown oils derived solely from castor oil, and prepared primarily for certain industrial purposes other than the demulsification of crude oil. Originally, they were probably prepared for use in mixing with certain petroleum oils so as to give lubricants of high specific gravity and high viscosity. In their use in such lubricants it was necessary to guard against gumminess. Blown oils have also been used as plasticizers in various plastic materials, particularly artificial leather, and similarly to their use in lubricants, gumminess in the blown oil is not desirable. Therefore, one distinguishing characteristic of the conventionally available blown oils is the substantial absence of any gumminess, gelatinization, or semi-livery property.

I have found that after commercially available blown oils are oxidized still further by means of a subsequent treatment with air or oxygen at rather elevated temperatures, for instances, 150 to 250° C., that one obtains an apparently new kind of blown oil, or at least a kind of blown oil which has not heretofore been employed in the breaking of oil field emulsions, or, in fact, for any other purpose. Such super-oxidized blown oils are characterized by a semi-livery consistency. Furthermore, their conversion into a salt of the kind described in the aforementioned Fuchs patent renders them substantially worthless for breaking oil field emulsions. Such blown oils are preferably employed without neutralization, or if neutralized, the neutralization must be effected with a weak base, such as triethanolamine, so that there is no saponification of any ester or ester-like compounds that may be present. There is no objection to the neutralization (saponification) of free acids. I have found this particular type of super-oxidized semi-livery blown oil to be effective on a wide variety of emulsions, particularly certain emulsions occurring in the Los Angeles basin in California. In treatment of such emulsions, there are instances where other well known demulsifying agents, including ordinary conventionally available blown oils, have been unsatisfactory. These super-oxidized, semi-livery blown oils are further characterized by the fact that slight additional oxidation renders them kerosene-insoluble. They do not appear to be suitable for the purposes for which ordinary conventionally available blown oils are intended, i. e., for use in lubricants or as plasticizers in artificial leather.

In order to clearly emphasize the fact that the blown oils I contemplate using are produced, by prolonged or more drastic oxidation than is employed in the production of ordinary blown oils, I will refer to the blown oils contemplated by my process as "super-oxidized blown oils", and in order to distinguish them from ordinary blown oils which are free from any gumminess or gelatinization, I shall refer to them as "semi-livery blown oils". It should be understood, however, that the words "semi-livery" refer to these blown oils as freshly prepared, because any oil capable of oxidation or polymerization, if allowed to stand long enough, may ultimately become semi-livery, or even solid, in some instances. In other words, the blown oils used as the demulsifying agent of my process are semi-livery when freshly prepared. Semi-livery, super-oxidized blown oil of the kind above referred to can be prepared by first continuing oxidation of commercially blown oils until kerosene-insolubility is reached, and then repeating the process a second time on a new sample, but with caution that the second time oxidation should stop at a point just short of kerosene-insolubility. In order to indicate the point at which super-oxidation must cease, I have herein referred to such oils as being "super-oxidized just short of kerosene-insolubility". This particular characteristic clearly defines these oils as being oxidized beyond ordinary conventionally available blown oils, but not oxidized quite enough to give kerosene-insolubility. At this particular point these blown oils possess the gummy, semi-livery physical characteristic previously referred to.

I may use these blown oils as such or after neutralization with triethanolamine, or after mixture with any suitable solvent of the kind well known in the art for admixture with crude oil demulsifying agents. The solvents most frequently used include conventional petroleum distillates, such as kerosene, gasoline, stove oil, etc.; coal tar distillates, such as benzol, solvent naphtha, etc.; alcohols, such as ethyl alcohol, methyl alcohol, denatured alcohol and also isopropyl alcohols, such as butyl alcohol, propyl alcohol, etc. The solvent or solvents selected will depend in part on the reactive fatty bodies used as raw materials in preparing the specific blown oils employed as the demulsifying agents of my process. As previously stated, these products may be neutralized to the extent that any free acidic hydrogen may be neutralized with a base, provided that the base does not saponify or break down any esters or ester-like compounds. I have not found caustic soda to be a suitable base, but have found triethanolamine to be particularly adaptable for neutralization.

I may use the above described drastically oxidized, semi-livery blown oil or oils alone or in combination with one or more other well known demulsifying agents. I particularly prefer to use such oil in a mixture of the kind described in my co-pending application for patent Serial No. 752,713, filed November 12, 1934, above referred to.

Such super-oxidized blown oils may be prepared from blown castor oil or blown oil derived from some other suitable oils, such as corn oil, sesame oil, cotton seed oil, rape seed oil, or a mixture of one or more of these oils with castor oil. It is obvious that the production of these super-oxidized blown oils need not be a two-step process, but instead, one may start with an unoxidized fatty body and simply continue the oxidation in one continuous step until products of the desired characteristics are produced. Similarly, instead of employing the oils themselves, such as castor oil, corn oil, cotton seed oil and the like, or mixtures of the same, one may employ the fatty acids thereof or mixtures of the same, or mixtures of the fatty acids and the naturally-occurring glycerides. Accordingly, I wish it to be understood that the expression "super-oxidized blown oils" is not intended to be restricted to the blown glycerides alone, but may apply equally well to blown fatty acids corresponding to the glycerides or to a mixture of the same with glycerides.

The treating agent or demulsifying agent that I prefer to use in my process is prepared in the following manner: I employ as a raw material any non-gummy blown castor oil, free from semi-livery characteristics and of the type conventionally employed in the manufacture of lubricants or used as a plasticizer in artificial leather. I heat a small quantity of this oil to approximately 200° C. and then subject it to violent agitation with a current of air until samples taken at short intervals reveal a semi-livery consistency and insolubility to kerosene. I repeat this procedure on a large scale but employ a slightly lower temperature and a slightly shorter period of oxidation so as to reach a point just short of kerosene-insolubility, previously referred to, but characterized by a semi-livery structure. I find that this particular reagent or product is perfectly satisfactory for use as a demulsifying agent or treating agent in the demulsification of crude oil emulsions, and will break many emulsions not susceptible to treatment with the conventionally available blown oils, and in certain instances, not susceptible to treatment with other available semi-drying oils. For the sake of convenience, I dilute this super-oxidized, semi-livery blown oil while still warm (60 to 70° C.), with an equal volume of kerosene, and for the treatment of some emulsions I add a small amount of triethanolamine so as to neutralize any free carboxylic hydrogen without decomposing any esters or ester-like combinations or similar bodies which may be present.

The superiority of the treating or demulsifying agent contemplated by my process is based upon its ability to treat certain emulsions more advantageously and at a somewhat lower cost than is possible with other known demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a certain number of cases which cannot be treated as easily and at so low a cost with the demulsifying agents heretofore available.

In practising my process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500 above referred to, may be required. In treating fresh emulsion, i. e., emulsions that will yield readily to the action of chemical demulsifying agents, the ratio of 1:30,000, above referred to, may be sufficient to produce highly satisfactory results. In general, I have found that for an average petroleum emulsion a ratio of 1 part of treating agent to 5,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsions to the action of a demulsifying agent produced or derived by the super-oxidation of a castor oil body in which oxidation has been continued until the super-oxidized mass is semi-livery in consistency when freshly prepared, and is further characterized by the fact that oxidation has been carried to a point just short of kerosene-insolubility.

2. A process for breaking petroleum emulsions of the water-in-oil type, which consists in subjecting the emulsions to the action of a demulsifying agent produced or derived by the super-oxidation of a castor oil body in which oxidation has been continued until the super-oxidized mass is semi-livery in consistency when freshly prepared and is further characterized by the fact that oxidation has been carried to a point just short of kerosene-insolubility, followed by dilution with a suitable solvent.

3. A process for breaking petroleum emulsions of the water-in-oil type, which consists in subjecting the emulsions to the action of a demulsifying agent produced or derived by the super-oxidation of a castor oil body in which oxidation has been continued until the super-oxidized mass is semi-livery in consistency when freshly prepared and is further characterized by the fact that oxidation has been carried to a point just short of kerosene-insolubility, followed by dilution with kerosene.

4. A process for breaking petroleum emulsions of the water-in-oil type, which consists in subjecting the emulsions to the action of a demulsifying agent produced or derived by the super-oxidation of a castor oil body in which oxidation has been continued until the super-oxidized mass is semi-livery in consistency when freshly prepared and is further characterized by the fact that oxidation has been carried to a point just short of kerosene-insolubility, followed by dilution with an equal volume of kerosene.

5. A process for breaking petroleum emulsions of the water-in-oil type, which consists in subjecting the emulsions to the action of a demulsifying agent produced or derived by the super-oxidation of a castor oil body in which oxidation has been continued until the super-oxidized mass is semi-livery in consistency when freshly prepared and is further characterized by the fact that oxidation has been carried to a point just short of kerosene-insolubility, followed by dilution with an equal volume of kerosene and subsequent neutralization of all the acidic hydrogen by means of triethanolamine.

CHARLES N. STEHR.